(12) United States Patent
Hadeli et al.

(10) Patent No.: US 11,243,508 B2
(45) Date of Patent: Feb. 8, 2022

(54) DETECTION OF ABNORMAL CONFIGURATION CHANGES

(71) Applicant: Hitachi Energy Switzerland AG, Baden (CH)

(72) Inventors: Hadeli Hadeli, Baden (CH); Wolfgang Wimmer, Langenthal (CH); Michael Obrist, Untersiggenthal (CH)

(73) Assignee: Hitachi Energy Switzerland AG, Baden (CH)

( * ) Notice: Subject to any disclaimer, the term of this patent is extended or adjusted under 35 U.S.C. 154(b) by 1098 days.

(21) Appl. No.: 15/625,405

(22) Filed: Jun. 16, 2017

(65) Prior Publication Data

US 2017/0364053 A1    Dec. 21, 2017

(30) Foreign Application Priority Data

Jun. 16, 2016  (EP) .................................... 16174838

(51) Int. Cl.
*G05B 19/406*  (2006.01)
*H04L 29/06*  (2006.01)
(Continued)

(52) U.S. Cl.
CPC ......... *G05B 19/406* (2013.01); *G06F 21/566* (2013.01); *G06F 21/577* (2013.01);
(Continued)

(58) Field of Classification Search
CPC .. G05B 19/406; G06F 21/577; H04L 63/1416
See application file for complete search history.

(56) References Cited

U.S. PATENT DOCUMENTS

2006/0034305 A1* 2/2006 Heimerdinger ..... H04L 63/1408
                                                         370/408
2011/0039237 A1* 2/2011 Skare .................... G06F 21/577
                                                         434/118
(Continued)

FOREIGN PATENT DOCUMENTS

CN       101035030 A     9/2007
CN       101159523 A     4/2008
(Continued)

OTHER PUBLICATIONS

European Patent Office, Extended Search Report issued in corresponding Application No. 16174838.9, dated Aug. 9, 2016, 8 pp.

*Primary Examiner* — Manuel A Rivera Vargas
*Assistant Examiner* — Yaritza H Perez Bermudez
(74) *Attorney, Agent, or Firm* — Slater Matsil, LLP

(57) ABSTRACT

The invention relates to a method for analyzing an abnormal event in an industrial automation and control system, IACS, comprising the following steps: identifying the abnormal event; detecting a root cause of the abnormal event; and generating a notification if the root cause is not a user activity and, if the root cause is a user activity, evaluating the possible impact on the IACS caused by the abnormal event, and generating a notification if the evaluation of the possible impact does not match a predefined list of allowable behavior. The present invention also relates to a corresponding system and corresponding computer program product comprising one or more computer readable media having computer executable instructions for performing the steps of the method.

20 Claims, 3 Drawing Sheets

(51) Int. Cl.
*G06F 21/57* (2013.01)
*G06F 21/56* (2013.01)

(52) U.S. Cl.
CPC ...... *H04L 63/1416* (2013.01); *H04L 63/1425* (2013.01); *G05B 2219/34465* (2013.01); *G06F 2221/034* (2013.01); *H04L 63/1441* (2013.01)

(56) References Cited

U.S. PATENT DOCUMENTS

| | | | | |
|---|---|---|---|---|
| 2011/0099444 | A1* | 4/2011 | Tredoux | G06F 11/08 714/746 |
| 2011/0288692 | A1* | 11/2011 | Scott | H04L 63/20 700/297 |
| 2014/0283067 | A1* | 9/2014 | Call | H04L 63/1466 726/23 |
| 2014/0298399 | A1* | 10/2014 | Heo | H04L 63/1416 726/1 |
| 2015/0135317 | A1* | 5/2015 | Tock | G06F 21/56 726/23 |
| 2016/0050225 | A1* | 2/2016 | Carpenter | H04L 63/1416 726/25 |
| 2016/0066189 | A1* | 3/2016 | Mahaffey | H04L 63/14 455/405 |
| 2016/0085986 | A1* | 3/2016 | Long | G06F 21/55 726/1 |
| 2016/0127207 | A1* | 5/2016 | Zaccaria | G05B 19/0428 709/224 |
| 2017/0244749 | A1* | 8/2017 | Shulman | H04L 63/1425 |
| 2017/0289191 | A1* | 10/2017 | Thioux | H04L 63/1441 |
| 2018/0013768 | A1* | 1/2018 | Hunt | G06F 21/552 |
| 2018/0048665 | A1* | 2/2018 | Shulman | H04L 63/1425 |
| 2018/0211033 | A1* | 7/2018 | Aditham | G06F 21/316 |
| 2018/0295028 | A1* | 10/2018 | Bao | H04W 12/08 |
| 2018/0351986 | A1* | 12/2018 | Johns | H04L 63/1416 |
| 2019/0098528 | A1* | 3/2019 | Chong | H04W 76/30 |
| 2019/0173899 | A1* | 6/2019 | Tews | G06N 7/005 |
| 2019/0180032 | A1* | 6/2019 | Shibahara | G06F 21/55 |
| 2019/0373128 | A1* | 12/2019 | Kozuka | H04N 1/00928 |
| 2020/0201995 | A1* | 6/2020 | Gahlot | G06F 11/3438 |
| 2020/0244699 | A1* | 7/2020 | Hutchinson | G06N 5/003 |
| 2020/0310380 | A1* | 10/2020 | Sun | G05B 19/408 |

FOREIGN PATENT DOCUMENTS

| | | |
|---|---|---|
| EP | 1420317 A2 | 5/2004 |
| EP | 1420317 A3 | 12/2005 |
| EP | 3002648 A2 | 4/2016 |
| EP | 3024192 A1 | 5/2016 |
| EP | 3002648 A3 | 6/2016 |

* cited by examiner

DETECTION OF ABNORMAL CONFIGURATION CHANGES

FIELD OF THE INVENTION

The invention relates to a method for detecting abnormal configuration changes in an industrial automation and control system, IACS, a corresponding IACS as well as a corresponding computer program product. In particular, the invention relates to the cyber security and maintenance aspects in the industrial automation and control systems.

BACKGROUND OF THE INVENTION

Industrial control devices are nowadays designed to include basic cyber security mechanisms such as authentication, authorization and logging. This imposes authentication needed for a user who want to perform some changes in the device.

For any authenticated user, the device will authorize certain permission to the respective user. Additionally, with a logging mechanism, a device can log all the user activities and send the events log to a centralized collection system.

The configuration of an IACS is nowadays mostly well-documented in a machine readable format. For instance, in the domain of IEC 61850, the configuration of an IACS is normally well described in a system configuration description.

Therefore, once the IEC 61850 substation is commissioned, changes to the configuration are unlikely to happen.

Reference [1] relates to a unit for validating a communication network of an industrial automation and control system and to a method of validating a communication network of an industrial automation and control system. In particular, reference [1] relates to a unit for validating a communication network of an industrial automation and control system, comprising a planner module configured to store plan data defining a designed communication network of an industrial automation and control system, a collector module configured to collect effective data defining a deployed communication network of the industrial automation and control system, and a difference detector configured to detect differences between the designed communication network and the deployed communication network using the plan data and the effective data.

Reference [2] is an IBM white paper and relates to enhance management for multiprotocol label switching networks with IBM solutions.

DESCRIPTION OF THE INVENTION

It is therefore an objective of the invention to detect abnormal configuration changes in an industrial automation and control system, IACS.

It is also an objective of the invention to identify possible upcoming events, e.g. a disturbance to the IACS operation, cyber security event or maintenance event, by correlating actions that are performed on industrial control devices against the recorded and/or commissioned configuration of the industrial automation and control systems.

It is also an objective of the invention to identify certain abnormal configuration changes that may be an action from a targeted attack.

It is also an objective of the invention to identify that certain configuration changes are not completed properly.

These and other objectives are achieved by a method, a system and a computer program product according to the independent claims. Preferred embodiments are evident from the dependent patent claims.

The invention relates to a method for analyzing an abnormal event in an industrial automation and control system, IACS, comprising the following steps: identifying the abnormal event; detecting a root cause of the abnormal event; and generating a notification if the root cause is not a user activity, and, if the root cause is a user activity, evaluating the possible impact on the IACS caused by the abnormal event, and generating a notification if the evaluation of the possible impact does not match a predefined list of allowable behavior.

Preferably, the abnormal event is identified using a predefined list of allowable event types and/or of abnormal event types.

Preferably the predefined list of allowable event types and/or of abnormal event types is created using supervision diagnosis data.

Preferably, evaluating the possible impact on the IACS is performed by evaluating at least one change in the configuration of the IACS related to the identified abnormal event.

Preferably, evaluating the change in the configuration of the IACS caused by the abnormal event is performed by comparing a predefined configuration of the IACS with the at least one change in the configuration of the IACS caused by the abnormal event.

Preferably, the at least one change in the configuration of the IACS is caused by an incident event from at least one industrial control device of the IACS or connected to the IACS.

Preferably, the predefined configuration is a commissioned configuration. Preferably, the predefined configuration is a configuration previously running on the IACS. Preferably, the predefined configuration is a configuration currently running on the IACS.

Preferably, the step of evaluating the possible impact on the IACS is performed using information on at least one electronic device that has been affected by the at least one change in the configuration of the IACS. Preferably, the step of evaluating the possible impact on the IACS is performed using information on the functionality of the at least one electronic device. Preferably, the functionality of the at least one electronic device is the at least one electronic device being a sender in the IACS. Preferably, the functionality of the at least one electronic device is the at least one electronic device being a receiver in the IACS. Preferably, the step of evaluating the possible impact on the IACS is performed using information on the interconnection of the at least one electronic device with at least one other electronic device of the IACS. Preferably, the interconnection between two electronic devices of the IACS is that one of the two electronic devices is a receiver and the other one of the two electronic devices is a sender.

Preferably, the method further comprises the step of detecting the at least one change in the configuration of the IACS is caused by an incident event.

Preferably, the step of detecting at least one change in the configuration of the IACS is performed using at least one status monitoring information of the IACS or at least one part of the IACS. Preferably, the step of detecting at least one change in the configuration of the IACS is performed using the Simple Network Management Protocol, SNMP, of the IACS or at least one part of the IACS, e.g. at least one IED of the IACS.

Preferably, evaluating the possible impact on the IACS is performed analyzing a configuration file uploaded to at least one device of the IACS, the configuration file contains information and/or instructions for the change in the configuration of the IACS.

Preferably, the step of evaluating the possible impact on the IACS is performed analyzing whether the at least one device is an instruction sender and/or receiver within the IACS. Preferably, the step of evaluating the possible impact on the IACS is performed analyzing whether there is a change in the functionality of the sender and/or receiver.

Preferably, the step of evaluating the possible impact on the IACS is performed analyzing the validity of a certificate of the user. Preferably, the step of evaluating the possible impact on the IACS is performed analyzing the validity of credentials of the user.

Preferably, information on the result of evaluating the possible impact on the IACS caused by the abnormal event and information on the abnormal event are linked and the linked information is stored in a record.

Preferably, evaluating the possible impact on the IACS is performed checking a record, the record comprising linked information on at least one previous result of evaluating a possible impact on the IACS caused by a previous abnormal event and information on said at least one previous abnormal event.

Preferably, the generated notification is sent to an operator of the IACS. Preferably, the generated notification comprises a temporal alert. This temporal alert can be an indicator to the operator of the IACS to check the completeness of certain configuration changes which, leaving uncompleted, would preferably result in a not-allowable behaviour of the IACS.

The invention also relates to an industrial automation and control system, IACS, comprising: an identification unit configured to identify the abnormal event; a detection unit configured to detect a root cause of the abnormal event; and a generating and evaluating unit configured to generate a notification if the root cause is not a user activity and, if the root cause is a user activity, configured to evaluate the possible impact on the IACS caused by the abnormal event, and generating a notification if the evaluation of the possible impact does not match a predefined list of allowable behavior.

Preferably, the identification unit is configured to identify the abnormal event by using a predefined list of allowable event types and/or of abnormal event types.

Preferably, the generating and evaluating unit is configured to evaluate the possible impact on the IACS by using information on at least one of the following: at least one electronic device that has been affected by the abnormal event, the functionality of the at least one electronic device and the interconnection of the at least one electronic device with at least one other electronic device of the IACS.

Preferably, the generating and evaluating unit is configured to evaluate the possible impact on the IACS by analyzing a configuration file uploaded to at least one device of the IACS, the configuration file contains information and/or instructions for the change in the configuration of the IACS.

Preferably, the generating and evaluation unit is configured to evaluate the possible impact on the IACS by analyzing whether at least one device is an instruction sender and/or receiver within the IACS and whether there is a change in the functionality of the sender and/or receiver.

Preferably, the generating and evaluation unit is configured to evaluate the possible impact on the IACS by analyzing the validity of a certificate of the user.

Preferably, the system comprises a further unit being configured to link the result of evaluating the possible impact on the IACS caused by the abnormal event and information on the abnormal event and is configured to store the linked information in a record. Preferably, the record is comprised in the system.

Preferably, the generating and evaluating unit is configured to evaluate the possible impact on the IACS by checking a record, the record comprising linked information on at least one previous result of evaluating a possible impact on the IACS caused by a previous abnormal event and information on said at least one previous abnormal event.

The invention also relates to a computer program product comprising one or more computer readable media having computer executable instructions for performing the steps of any of the above-discussed methods.

It is understood by the skilled person that the aforementioned methods/method steps also apply to at least one part or a plurality of parts of an IACS.

By means of comprehensive networking in the IACS, the present invention enables to collect both the logging information and the complete description of the IACS on the same place, e.g. a server of the provider of the IACS, and to perform a correlation analysis that can predict the most likely upcoming events that can happen due to some changes on the industrial control devices.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their primary meanings, are listed in summary form in the list of designations. In principle, identical parts are provided with the same reference symbols in the figures.

DETAILED DESCRIPTION OF PREFERRED EMBODIMENTS

Figure 1:
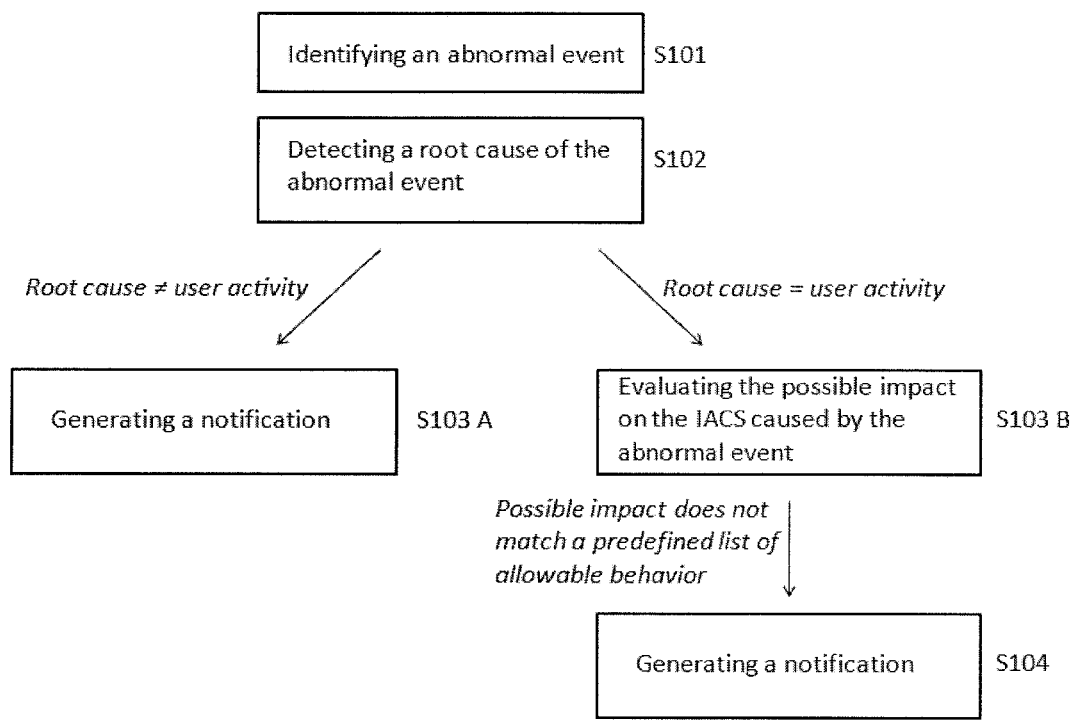
FIG. 1 schematically shows a flowchart according to an embodiment of the invention.

In a $1^{st}$ step, S101 an abnormal event is identified. The event can be a user activity event or an incident event, e.g. caused by the IACS or a part of the IACS, e.g. an IED, itself or caused by external sources, e.g. a hack. The abnormality is, according to this embodiment, determined by looking up a predefined list of allowable event types, i.e. a white-list of allowable events/event types, and/or a predefined list of abnormal event types, i.e. a black-list of abnormal events/event types. In this context, for every event logged, the activity can be checked that has been performed by the user and the system identifies the device on which the activity is conducted, what has been modified in the activity and when it is modified by whom.

In a $2^{nd}$ step, S102, the root cause of the abnormal event is detected for example, if the user changes the protection parameters, then this change is categorised as a user event.

Subsequently, it is classified whether the root cause of the abnormal event is a user activity or the root cause is not a user activity.

If the root cause of the abnormal event is not a user activity, then, in step S103 A, the notification is generated and the notification is reported to an operator of the IACS.

If the root cause of the abnormal event is a user activity, then, in step S103 B, the possible impact on the IACS caused by the abnormal event is evaluated. In other words, the possible behaviour of the IED and/or the IACS is analyzed caused by the abnormal event. For example impact analysis can be done by identifying what device has been changed, what is the role of the device in the overall IACS and how the device is interconnected within the IACS. For instance, if a new CCF/CID file is uploaded on a certain IED, then, by analyzing the SCD file, it is possible to identify whether the IED is an instruction sender or receiver and also to identify the connected/related devices. Such changes may have impact on the overall dataflow in the substation automation system. Another example shows a change that is performed on a network switch, e.g. changing a port from full duplex to half duplex. Then it can be expected that there will be message losses or delays due to collisions. The impact in this case can be a possible device breakdown, an incident, a cyber security event or even a maintenance event. Impact analysis can be aided by certain documented/programmed expert knowledge or a simple logical reasoning. Input to the analysis engine can be for example: SCD file, knowledge based evaluation, expert know-how, or certificate validity of a user that does a maintenance activity.

In a next step, S104, a notification is generated if the evaluation of the possible impact discloses that the expected behaviour does not match a predefined list of allowable behaviour. In addition, a possible impact record can be created by combining information on the abnormal event, preferably also configuration changes of the IACS or at least one part of the IACS, e.g. an IED, caused by the abnormal event and the possible impact. In addition, based on the evaluation, e.g. if it is evaluated that the expected behaviour does not match a predefined list of allowable behaviour, a temporal notification, i.e. an alert, can be set that goes off in the future. This alert can be an indicator to the operator of the IACS to check the completeness of certain configuration changes caused by the abnormal event, e.g. the configuration changes if left uncompleted would result in non-allowable behaviour but if completed would result in allowable behaviour. In addition, evaluating the possible impact on the IACS or part of the IACS, like an IED, is performed checking a record, the record comprising linked information on at least one previous result of evaluating a possible impact on the IACS caused by at least one previous abnormal event and information on the at least one previous abnormal event. In other words, it can be checked whether there is a recorded possible impact based on a certain user activity in the past. If there is one, the system can quickly identify the possible cause of the incident and also the possible user that causes this incident to happen.

Figure 2:
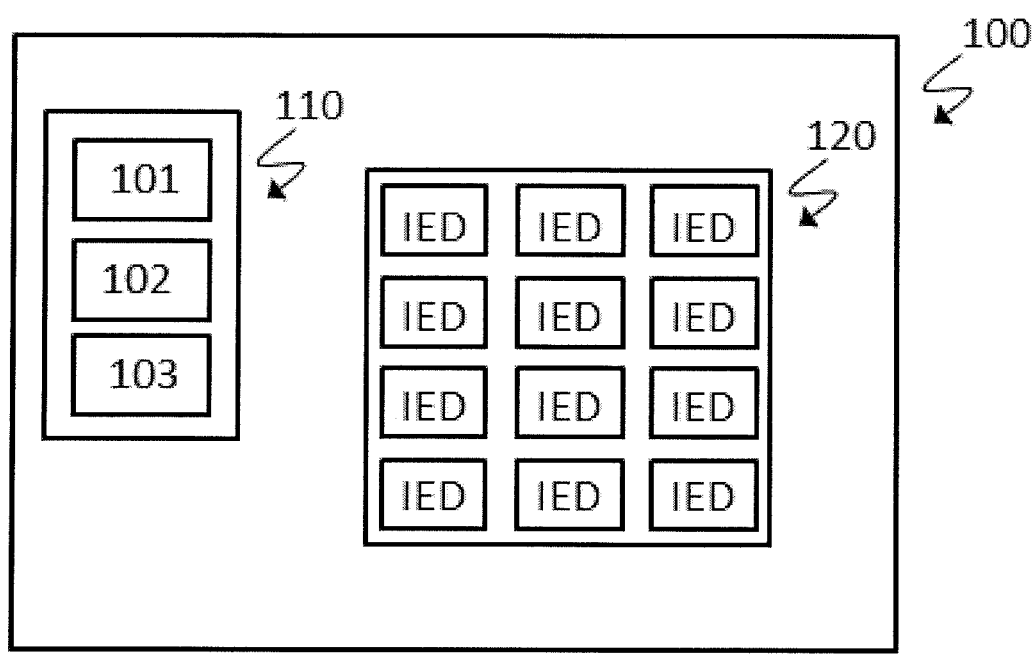
FIG. 2 schematically shows an industrial automation and control system according to an embodiment of the invention.

FIG. 2 schematically shows an industrial automation and control system 100 according to an embodiment of the invention. The system 100 comprises a control unit 110 and a plurality 120 of intelligent electronic devices, IEDs. The control unit comprises an identification unit 101, a detection unit 102, and generating and evaluating unit 103 and a generation unit 104.

If a user, for example, uploads a new configuration file to one of the IEDs, e.g. a new CCF/CID file according to the IEC 61850 specification, the identification unit 101 identifies whether this uploading is an abnormal event or not. In this preferred embodiment, the determination whether the event refers to an abnormal event or not is based on looking up a respective list of allowable events, i.e. a white-list of events.

In a next step, the detection unit 102 detects the root cause of the abnormal event. In other words, the detection unit 102 determines whether the abnormal event is caused by a user or not. If the root cause is not a user event, then the generating and evaluating unit 103 generates a notification and sends this notification to an operator of the IACS.

However, if the root cause is a user event, then the generating and evaluating unit 103 evaluates the possible impact on the IED and/or the whole IACS 100 caused by the abnormal event. For example, the generating and evaluating unit 103 analyses the CCF file and identifies whether said IED is an instruction sender or receiver in the IACS 100 and also identifies connected and/or related devices in the IACS 100. In other words, the generating and evaluating unit 103 uses information on the IED that has been affected by the change in the configuration of the IED/IACS 100 caused by the abnormal event, uses information of the IED itself, e.g. whether the IED is a sender or receiver in the IACS 100 and also evaluates the interconnection of said IED with other devices of the IACS 100, e.g. other IEDs of the plurality 120 of IEDs. If the evaluation of the possible impact does not match a predefined list of allowable behaviour of the IACS 100 caused by the abnormal event, the generating and evaluating unit 103 generates a notification. In other words, if the possible impact of the change in the configuration caused by the abnormal event causes a behaviour of the IED/IACS 100 that does not match a predefined list of allowable behaviour of the IACS 100, an alert and/or a notification to an operator of the IACS 100 is generated.

In another embodiment according to the present invention, the generating and evaluating unit 103 evaluates a change in the configuration file, e.g. a CCF file, caused by the abnormal user event. The generating and evaluating unit 103 can trigger the IED to check what the role of the IED and the IACS is and whether there is a change in a sender. If not, then the change in the configuration may just be the change that affects only that particular IED. However, if the sender of the IEDs has changed, the generating and evaluating unit 103 can determine all possible receivers/receiving IEDs of the IACS. This information can for example be retrieved from the IEC 61850 SCD file. Upon knowing the receivers, the generating and evaluating unit 103 can set an alarm that goes off after a certain amount of time. The amount of time can be determined from the maintenance record/previously running configuration file or simply by assuming that the configuration change has to be done within the same business day. When the sender and receivers are updated, then most likely the dataflow has changed correctly, and the alarm can be reset. If the dataflow is changed only partly and there is no notice of further maintenance in the system, then this might be a targeted attack that needs further investigation, or an error of the maintenance engineer identified by his/her credentials.

Figure 3:
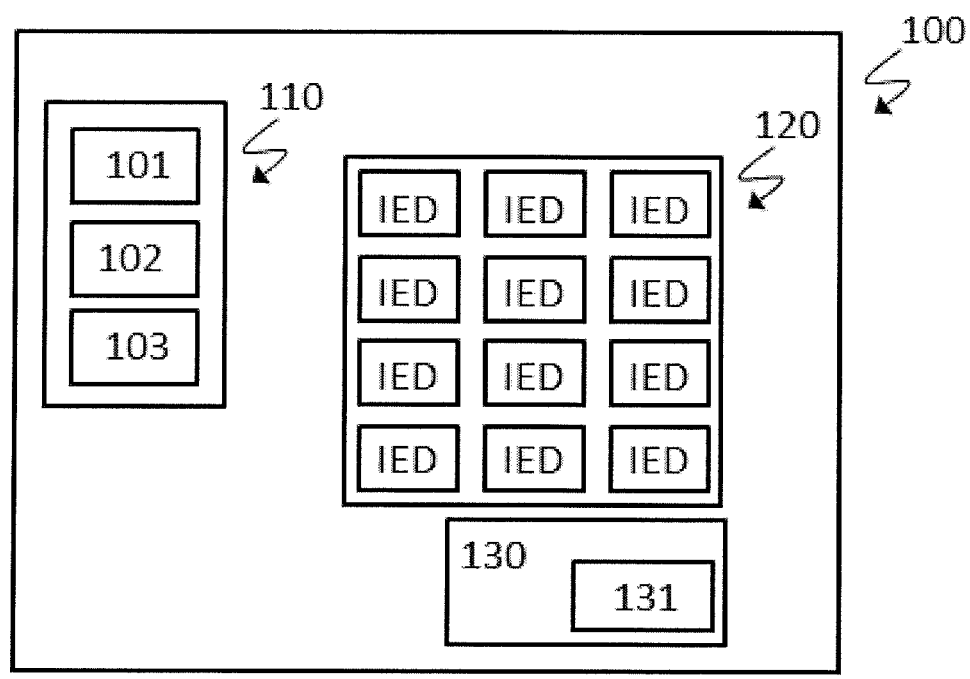
FIG. 3 schematically shows an industrial automation and control system according to another embodiment of the invention.

FIG. 3 schematically shows an industrial automation and control system 100 according to another embodiment of the invention. The system 100 comprises a control unit 110, a plurality 120 of intelligent electronic devices, IEDs, and a substation 130 comprising a network switch 131. Also in this embodiment, the control unit comprises an identification unit 101, a detection unit 102, and generating and evaluating unit 103.

A user is commissioned to the substation 130 to update the firmware of the network switch 131. After reaching the network switch, the user logs into the network switch 131 using his/her credentials. The user then performs the firmware update of the network switch 131. The network switch 131 records this action and send the user event log and change in the configuration to the identification unit 101. Alternatively, the identification unit 101 automatically detects the change in the configuration of the network switch 131.

After performing the firmware upgrade of the network switch 131, the user performs certain sanity checks. In this case, the user switches the port behaviour from full duplex to half duplex. After the cheque, the user should have switched the port behaviour back to full duplex. However, the user forgot to switch back the port behaviour of the switch 131. The network switch 131 records this action/ changing configuration and sends the event to the identification unit 101. Alternatively, the identification unit 101 automatically detects said abnormal event and the respective change in the configuration of the network switch 131. The detection unit 102 detects that the root cause of said abnormal event is a user event and the generating and evaluating unit 103 compares the aforementioned change in the configuration of the network switch 131 caused by the abnormal user event with the commissioned configuration and concludes that there is a deviation to the commission consideration of the network switch. The generating and evaluating unit 103 evaluates the impact of changing the port behaviour and concludes that said change of the port behaviour results in missing traffic. This missing traffic is not-allowable behaviour of the switch 131 of the IACS 100 and the generation unit 104 generates a respective notification to the operator of the IACS 100.

Another example is that a user clears out the filter of the network switch 131 and then the traffic is not filtered any more. In this case, the generating and evaluating unit 103 evaluates the impact of clearing out the filter of the network switch 131 and concludes that said clearing results in the non-filtering of the traffic possibly causing at least one part of the IACS 100, possibly at least one of the plurality 120 of the IED's to be overloaded. This overload is a not-allowable behaviour of the switch 131 of the IACS 100 and the generating and evaluating unit 103 generates a respective notification to the operator of the IACS 100.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF DESIGNATIONS

- 100—industrial automation and control system, IACS
- 110—control unit
- 101—identification unit
- 102—detection unit
- 103—generating and evaluating unit
- 120—plurality of intelligent electronic devices, IED
- 130—substation
- 131—network switch

REFERENCES

[1]—EP 2 608 450 A1
[2]—Enhance management for multiprotocol label switching networks with IBM solutions; IBM white paper; XP055029832; retrievable from ftp://ftp.software.ibm.com/common/ssi/rep_wh/n/GMW14019USEN/GMW14019USEN.PDF

The invention claimed is:

1. A method for analyzing an abnormal event in an industrial automation and control system (IACS) comprising:
   identifying the abnormal event;
   detecting a root cause of the abnormal event;
   determining whether the root cause is a user activity by an authenticated user;
   classifying the root cause as the user activity by the authenticated user or as not the user activity by the authenticated user;
   in case the root cause is classified as not the user activity by the authenticated user, generating a first notification in response to the root cause being classified as not the user activity by the authenticated user;
   in case the root cause is classified as the user activity by the authenticated user:
   evaluating a possible impact on the IACS caused by the abnormal event;
   in response to the evaluation of the possible impact not matching any entries in a predefined list of allowable behavior, generating a temporary alert for the authenticated user to check completeness of changes to a configuration of the IACS; and
   in response to the changes to the configuration of the IACS being completed, determining that the completed changes match an entry in the predefined list of allowable behavior, and expiring the temporary alert.

2. The method according to claim 1, wherein the abnormal event is identified using a predefined list of allowable event types and/or of abnormal event types.

3. The method according to claim 1, wherein evaluating the possible impact on the IACS is performed by evaluating at least one change in the configuration of the IACS caused by the abnormal event.

4. The method according to claim 3, wherein evaluating the at least one change in the configuration of the IACS caused by the abnormal event is performed by comparing a predefined configuration of the IACS with the at least one change in the configuration of the IACS caused by the abnormal event.

5. The method according to claim 4, wherein the predefined configuration is at least one of the following: a commissioned configuration, a configuration previously running on the IACS, or a configuration currently running on the IACS.

6. The method according to claim 1, wherein evaluating the possible impact on the IACS is performed using information on at least one of the following: at least one electronic device that has been affected by the abnormal event, a functionality of the at least one electronic device, or an interconnection of the at least one electronic device with at least one other electronic device of the IACS.

7. The method according to claim 3, wherein evaluating the possible impact on the IACS is performed by analyzing a configuration file uploaded to at least one device of the IACS, and the configuration file contains information and/or instructions for the at least one change in the configuration of the IACS.

8. The method according to claim 6, wherein evaluating the possible impact on the IACS is performed by analyzing whether the at least one electronic device is an instruction sender and/or receiver within the IACS and whether there is a change in a functionality of the sender and/or receiver.

9. The method according to claim 1, wherein information on a result of evaluating the possible impact on the IACS caused by the abnormal event and information on the abnormal event are linked, and the linked information is stored in a record.

10. The method according to claim 1, wherein evaluating the possible impact on the IACS is performed by checking a record, the record comprising linked information on at least one previous result of evaluating a possible impact on the IACS caused by at least one previous abnormal event and information on the at least one previous abnormal event.

11. An industrial automation and control system (IACS) comprising:
a plurality of intelligent electronic devices (IEDs); and
a control unit communicatively coupled to the IEDs, the control unit configured to:
identify an abnormal event;
detect a root cause of the abnormal event;
determine whether the root cause is a user activity by an authenticated user;
classify the root cause as the user activity by the authenticated user or as not the user activity by the authenticated user;
generate a first notification if the root cause is classified as not the user activity by the authenticated user; and
if the root cause is classified as the user activity by the authenticated user:
evaluate a possible impact on the IACS caused by the abnormal event;
if the evaluation of the possible impact does not match any entries in a predefined list of allowable behavior, generate a temporary alert for the authenticated user to check completeness of changes to a configuration of the IACS; and
in response to the changes to the configuration of the IACS being completed, determine that the completed changes match an entry in the predefined list of allowable behavior, and expire the temporary alert.

12. The IACS according to claim 11, wherein the control unit is configured to identify the abnormal event by using a predefined list of allowable even types and/or of abnormal event types.

13. The IACS according to claim 11, wherein the control unit is configured to evaluate the possible impact on the IACS by using information on at least one of the following: at least one electronic device that has been affected by the abnormal event, a functionality of the at least one electronic device, or an interconnection of the at least one electronic device with at least one other electronic device of the IACS.

14. The IACS according to claim 11, wherein the generating and evaluation unit is configured to evaluate the possible impact on the IACS by analyzing whether at least one device is an instruction sender and/or receiver within the IACS and whether there is a change in a functionality of the sender and/or receiver.

15. A computer program product for analyzing an abnormal event in an industrial automation and control system (IACS) and comprising one or more non-transitory computer readable media having computer executable instructions for performing the steps of:
identifying the abnormal event;
detecting a root cause of the abnormal event;
determining whether the root cause is a user activity by an authenticated user;
classifying the root cause as the user activity by the authenticated user or as not the user activity by the authenticated user;
generating a first notification if the root cause is classified as not the user activity by the authenticated user; and
if the root cause is classified as the user activity by the authenticated user, user:
evaluating a possible impact on the IACS caused by the abnormal event;
if the evaluation of the possible impact does not match any entries in a predefined list of allowable behavior, generating a temporary alert for the authenticated user to check completeness of changes to a configuration of the IACS; and
in response to the changes to the configuration of the IACS being completed, determining that the completed changes match an entry in the predefined list of allowable behavior, and expiring the temporary alert.

16. The method according to claim 2, wherein evaluating the possible impact on the IACS is performed by evaluating at least one change in the configuration of the IACS caused by the abnormal event.

17. The method according to claim 16, wherein evaluating the possible impact on the IACS is performed using information on at least one of the following: at least one electronic device that has been affected by the abnormal event, a functionality of the at least one electronic device, or an interconnection of the at least one electronic device with at least one other electronic device of the IACS.

18. The method according to claim 17, wherein information on a result of evaluating the possible impact on the IACS caused by the abnormal event and information on the abnormal event are linked, and the linked information is stored.

19. The method according to claim 18, wherein evaluating the possible impact on the IACS is performed by checking a record, the record comprising linked information on at least one previous result of evaluating a possible impact on the IACS caused by at least one previous abnormal event and information on the at least one previous abnormal event.

20. The method according to claim 19, wherein:
evaluating the at least one change in the configuration of the IACS caused by the abnormal event is performed by comparing a predefined configuration of the IACS with the at least one change in the configuration of the IACS caused by the abnormal event,
the predefined configuration is at least one of the following: a commissioned configuration, a configuration previously running on the IACS, or a configuration currently running on the IACS,
evaluating the possible impact on the IACS is performed by analyzing a configuration file uploaded to at least one device of the IACS,
the configuration file contains information and/or instructions for the at least one change in the configuration of the IACS, and evaluating the possible impact on the IACS is performed by analyzing whether the at least one electronic device is an instruction sender and/or receiver within the IACS and whether there is a change in a functionality of the sender and/or receiver.

\* \* \* \* \*

UNITED STATES PATENT AND TRADEMARK OFFICE
CERTIFICATE OF CORRECTION

PATENT NO. : 11,243,508 B2
APPLICATION NO. : 15/625405
DATED : February 8, 2022
INVENTOR(S) : Hadeli Hadeli et al.

Page 1 of 1

It is certified that error appears in the above-identified patent and that said Letters Patent is hereby corrected as shown below:

In the Claims

Claim 15, Column 10, Line 17; delete "user, user:" and insert --user:--.

Signed and Sealed this
Eighth Day of March, 2022

Drew Hirshfeld
*Performing the Functions and Duties of the
Under Secretary of Commerce for Intellectual Property and
Director of the United States Patent and Trademark Office*